Nov. 24, 1953

H. N. BLISS ET AL

2,660,335

CONTROL MEANS FOR LIQUID DISPENSING APPARATUS

Filed Feb. 11, 1950

Inventors
HARVEY N. BLISS
OTTO WILD, JR.

By Lindsey, Prutzman + Just
Attorneys

Nov. 24, 1953

H. N. BLISS ET AL 2,660,335

CONTROL MEANS FOR LIQUID DISPENSING APPARATUS

Filed Feb. 11, 1950

Inventors
HARVEY N. BLISS
OTTO WILD, JR.

By Lindsey, Brutzman & Just
Attorneys

Nov. 24, 1953  H. N. BLISS ET AL  2,660,335
CONTROL MEANS FOR LIQUID DISPENSING APPARATUS
Filed Feb. 11, 1950  5 Sheets-Sheet 3

Inventors
HARVEY N BLISS
OTTO WILD
By
Lindsey and Prutzman
Attorneys

Nov. 24, 1953 H. N. BLISS ET AL 2,660,335
CONTROL MEANS FOR LIQUID DISPENSING APPARATUS
Filed Feb. 11, 1950 5 Sheets-Sheet 4

Inventors
HARVEY N. BLISS
OTTO WILD, JR.

By
Lindsey, Prutzman + Just
Attorneys

Nov. 24, 1953  H. N. BLISS ET AL  2,660,335
CONTROL MEANS FOR LIQUID DISPENSING APPARATUS
Filed Feb. 11, 1950  5 Sheets-Sheet 5

Inventors
HARVEY N. BLISS
OTTO WILD, JR.

By
Lindsey, Prutzman & Just
Attorneys

Patented Nov. 24, 1953

2,660,335

UNITED STATES PATENT OFFICE 2,660,335

CONTROL MEANS FOR LIQUID DISPENSING APPARATUS

Harvey N. Bliss, Windsor, and Otto Wild, Jr., West Hartford, Conn., assignors to Veeder-Root Incorporated, Hartford, Conn., a corporation of Connecticut Application February 11, 1950, Serial No. 143,756

18 Claims. (Cl. 222—34)

1

The present invention relates generally to liquid dispensing apparatus and more particularly to interlocking mechanism for installation between the resetting mechanism for the register of such dispensing apparatus and the flow control means, whereby simultaneous or fraudulent operation thereof is effectively prevented.

In liquid dispensing apparatus of the type to which the present invention relates, a power driven mechanism is generally provided for establishing a flow of liquid through a dispensing hose and nozzle, the amount of fluid dispensed and usually also its cost being registered on a well known type of register or counting mechanism. The register or counting mechanism of the type generally used is constructed and arranged to be reset to zero prior to each dispensing operation so that the totals shown on the register indicating means will pertain only to the immediate dispensing operation. In order to insure proper use and operation of the dispensing apparatus, it is desirable to provide interlocking means which will compel the operator to perform a resetting operation before a subsequent dispensing operation can be effected, which will also compel the operator to carry a resetting operation to full completion once the same has been initiated, and which will prevent operation of the resetting mechanism while a dispensing operation is in progress.

A principal aim of the present invention is to provide an interlocking mechanism of the type referred to which is foolproof in operation, which accomplishes the desired interlocking effect without unduly restricting the normal use of the apparatus and which is of rugged and efficient design so that it can withstand hard and extended usage without failure.

It is a further aim of the invention to provide an interlocking mechanism as above described, which is simple in construction and compact and economical in size, so that it may be incorporated in a dispensing apparatus without presenting any difficulties as to the mounting of same or problems of space requirements, which can be assembled and installed with a minimum of difficulty and expense and which can be applied to standard registering apparatus without material redesign of the register and without materially increasing its cost.

It is another aim of the present invention to provide such an interlocking mechanism which is effective with both manual reset and power reset arrangements, i. e. whether the mechanism is such that the register is reset manually, such as

2 by the operator turning a crank, or whether the reset mechanism is driven by a motor which is operated merely by closing a motor switch.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
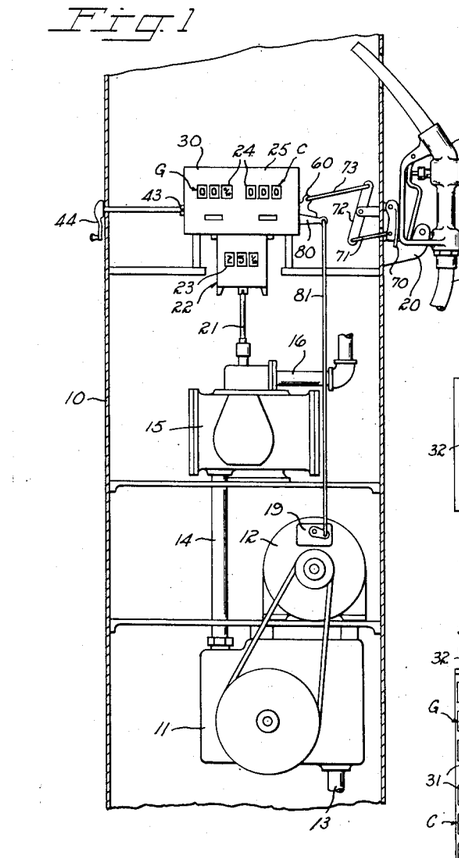
Figure 1 is a fragmentary front elevation of a gasoline dispensing apparatus embodying the present invention, the register being arranged for manual reset and the casing being in cross section to show the working parts of the apparatus.

Referring first to Figure 1 of these drawings, there is shown, in somewhat diagrammatic form, a conventional power driven gasoline dispensing apparatus which includes within a casing 10, a pump 11 driven by an electric motor 12 arranged to be turned on and off by a suitable spark-proof switch 19. The pump 11 is connected to draw gasoline through a suction pipe 13 from a suitable storage tank (not shown) and to deliver the liquid upwardly through pipe 14 to a conventional meter 15. After passing through the meter the liquid is conducted through an outlet pipe 16 to a flexible hose 17 provided at its outer end with a conventional dispensing nozzle 18. When the hose is not in use the nozzle 18 may be placed on a hook 20 supported on the casing 10.

The amount of liquid which is dispensed and which passes through the meter 15 is indicated by the turning of the meter shaft 21 which is connected to a speed change mechanism or variator 22, the output of which is transmitted to the register or counting mechanism 30. The arrangement is such that the register or counting mechanism 30 will indicate both the quantity and cost of the gasoline dispensed, the relationship therebetween being indicated by the price wheels 23 of the variator.

Figure 3:
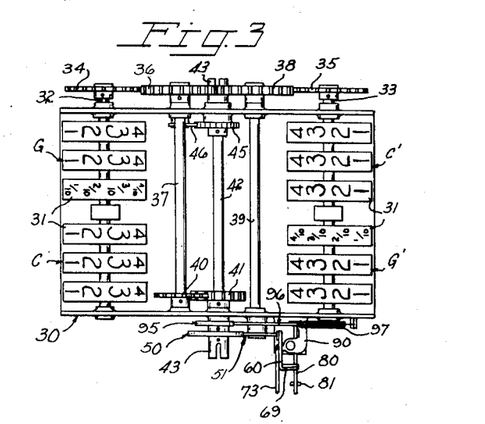
Fig. 3 is a plan view of the register and interlocking mechanisms.

Referring more particularly to Figure 3 of the drawings it will be seen that the register includes a plurality of number wheels 31 which are mounted on spaced apart parallel shafts 32 and 33. For purposes of illustration the number wheels 31 are shown in groups of three, the groups G and G' being utilized to indicate the quantity of the gasoline dispensed and the groups C and C' being utilized to indicate the cost of the gasoline dispensed. The groups of wheels G and C are adapted to be viewed through suitable windows 24 in the front of the register housing 25, while wheel groups G' and C' are adapted to be viewed from the rear by means of a similar arrangement (not shown).

Inasmuch as the mechanism for driving the register wheels forms no part of the present invention, a showing and description of the driving mechanism has been entirely omitted for simplicity and brevity of presentation. Such driving and transfer mechanism are well known in the art (see, for example, the patent to Slye No. 2,264,557 issued December 2, 1941) and as will be apparent from the following description, any suitable driving mechanism including transfer means between the wheels of lowest order and the wheels of highest order may be utilized without having any bearing on the present invention.

As illustrated in Figure 3 of the drawings, the register is of the type wherein the number wheels 31 are rotatable on the shafts 32 and 33 and can be driven in a registering direction without any accompanying turning of the shafts 32 and 33, the shafts being stationary except during a resetting operation. When the shafts 32 and 33 are rotated through one complete revolution to effect a resetting operation, the shaft will pick up the number wheels and advance them to an initial starting position where all the number wheels, as viewed through the windows 24, will be positioned at zero. The means whereby the shafts 32 and 33, when rotated, will pick up the wheels 31 has also been omitted from the drawings for simplicity of presentation, since the pickup means of itself forms no part of the present invention and any suitable arrangement may be employed, such as that shown in the Slye patent previously referred to.

Figure 2:
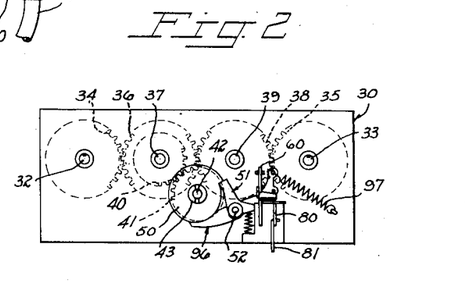
Fig. 2 is a side view of the register mechanism showing the interlocking mechanism in place thereon.

As best shown in Figures 2 and 3 of the drawings, the shafts 32 and 33 are arranged to be rotated to effect a resetting operation by gears 34 and 35 fixed to the ends of shafts 32 and 33, respectively. The gear 34 is driven directly by gear 36 fastened to the outer end of a countershaft 37 while the gear 35 is driven by the same gear 36 through an idler gear 38 freely mounted on a countershaft 39. As will be apparent, rotation of the shaft 37 (counter-clockwise in the illustrative embodiment) can be utilized to turn the shafts 32 and 33 which, as stated above, will advance the number wheels 31 to zero or initial starting position. The shaft 37 is adapted to be rotated to effect a resetting operation by means of gear 40 affixed adjacent its other end and meshing with a gear 41 fixed to a main reset shaft 42. The main reset 42 is provided with slotted coupling 43 at either end by means of which an operating mechanism, such as the crank 44 shown in Figure 1 or a power driven mechanism such as will be described in connection with Figures 7–10, may be connected thereto. The gear ratios employed, in the embodiments shown, are such that one complete turn of the main reset shaft 42 will effect one complete turn of shafts 32 and 33 which is just sufficient to advance the number wheels to the zero position. Turning of the main reset shaft 42 in the wrong direction is effectively prevented by a pawl 46 engaging a ratchet wheel 45 fixed to the reset shaft. Thus the main reset shaft 42 can be turned only in a clockwise direction, as viewed in Figure 2, which in turn will drive the countershaft 37 in a counter-clockwise direction, this being the proper direction, as mentioned above, for accomplishing a reset operation.

As indicated above, the mechanism so far described is more or less conventional and has been described here merely as illustrative and by way of background for the following description of the mechanism of the present invention and to assist in the proper understanding of the invention.

Figure 4:
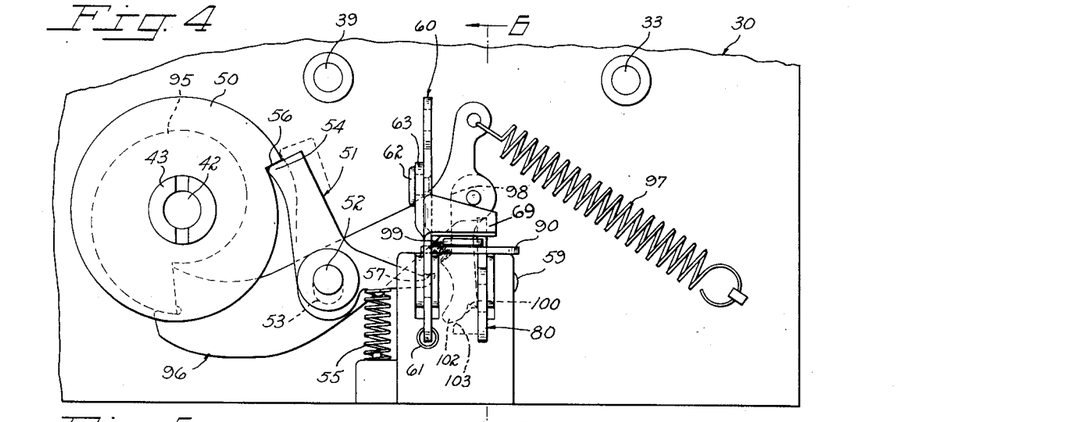
Fig. 4 is an enlarged fragmentary view similar to Fig. 2.

The operation of the main reset shaft 42 for resetting purposes is controlled, in accordance with the invention, by means of a disk 50 fixed to the outer end of the main reset shaft 42 which cooperates with a pawl 51 mounted on a stud 52 for pivoting movement and also for limited vertical movement. To this latter end the opening 53 through which the stud 52 is received is slightly elongated, as shown in the drawing. A spring 55 tends to push the pawl 51 upwardly on the stud 52 and also to pivot the pawl into engagement with the periphery of the disk 50. It will be noted that the disk 50 is formed with a shoulder 56 into which the nose 54 of the pawl will engage when the disk 50 is rotated to the position shown in Figure 4 of the drawings. The position of the disk 50 shown occurs when the main reset shaft has been turned to fully complete a resetting operation, bringing the number wheels to the zero or initial starting position. It will be apparent that so long as the nose 54 of the pawl 51 engages against the shoulder 56, the main reset shaft 42 cannot be turned to effect a resetting operation. However, if the pawl is momentarily pivoted so as to disengage the nose 54 from the shoulder 56, such as by applying force to the tail portion 57 in a downward direction, as viewed in Figure 4 of the drawing, the force of the spring 55 will move the pawl 51 to the position shown in dash lines in Figure 4 resulting in the nose of the pawl 51 resting against the periphery of the disk 50 slightly above the shoulder 56, thus freeing the reset shaft 42 for a resetting operation. However, if the reset shaft 42 is then turned through a complete revolution which is sufficient to effect a complete reset of the register, the nose of the pawl 51 will again engage against the shoulder 56 and halt the turning of the reset shaft.

The means employed, in accordance with the invention, for pivoting the pawl 51 to disengage the reset shaft to permit a reset operation includes a main control lever 60, which in the embodiment shown in Figures 1–6 of the drawings is under the control of the hose hook. The main control lever 60 is pivoted on a pin 59 and is urged toward the position shown in Fig. 6B and in dash lines in Figure 6 by a spring 61. The lever 60 has pivoted thereon, at 62, a boot-like pawl 63 which is urged away from the lever 60 by a spring 64. The pawl 63 has a heel portion 65 which is adapted to engage the tail 57 of the pawl 51 and to pivot the pawl 51 when the main operating arm 60 is moved from the position shown in Fig. 6A and in solid lines of Figure 6 to the position shown in dash lines. The pawl 63 is further provided with a toe portion 66 which is adapted to engage a cam surface 67 which is effective to cam the pawl 63 out of engagement with the tail 57 of pawl 51, when the pawl 51 has been pivoted sufficiently to disengage it from the shoulder 56 of the disk 50 and just prior to the completion of movement of the main operating arm 60 to the position shown in dash lines. Fig. 6B illustrates the position of the pawl 63 just prior to disengagement with pawl 51. As a result, when the main operating arm 60 is moved from the solid line position in Fig. 6 to the dash line position the pawl 51 is first pivoted to free the reset shaft for a resetting operation and then the pawls 51 and 63 are cammed into disengagement so as to permit pawl 51 to again cooperate with disk 50 to limit movement of the reset shaft to one complete turn and to prevent a second operation of the reset shaft until the main operating arm 60 is again moved from solid line position to dash line position. As will be apparent, pawls 51 and 63 will be reengaged by the action of spring 64 when the main operating arm is moved from dash line position to solid line position.

As previously mentioned, the main operating lever 60 is under the control of the hose hook in the embodiment shown in Figures 1–6 of the drawings. Referring to Figure 1 it will be noted that when the nozzle 18 is placed on the hook 20 the handle of the nozzle pivots an arm 70 inwardly toward the casing and this arm is connected through link 71, pivoted lever 72 and link 73 to the main operating lever 60. The result is that when the hose nozzle is placed on the hook 20 the main operating arm 60 is moved from dash line position to solid line position, as viewed in Figure 6, and when the nozzle 18 is removed from the hook 20 the main operating arm 60 is moved from solid line position to dash line position under the influence of spring 61. Accordingly, the register cannot be reset after a given dispensing operation until the nozzle is replaced on the hook 20 and then subsequently removed.

For the purpose of starting the motor 12 to place the apparatus in condition for a dispensing operation, there is provided a power control lever 80 which is connected by a connecting rod 81 to the switch 19 previously referred to as controlling the motor 12. The power control lever 80 is also pivoted on the pin 59 so that it can be pivoted from the full line position to the dash line position shown in Figure 6. In the embodiment shown, when the power control lever is in the full line position the motor switch 19 is in its off or open position and when the power control lever is in the dash line position the motor control switch 19 is in its on or closed position.

Figure 5:
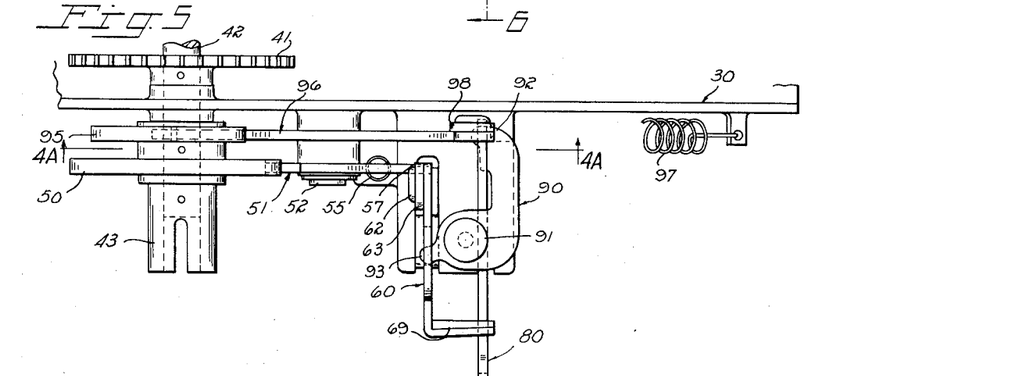
Fig. 5 is an enlarged plan view of the interlocking mechanism.
Figure 6:
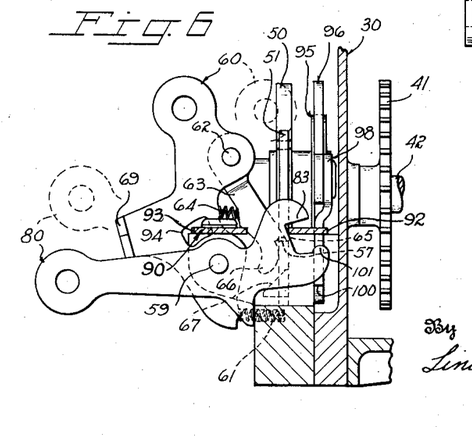
Fig. 6 is a cross-sectional view taken along the lines 6—6 of Fig. 4.
Figure 6A:
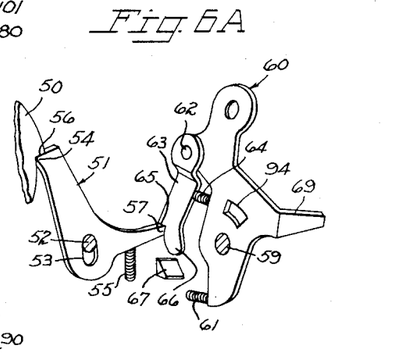
Figs. 6A and 6B are perspective views showing the two positions of the reset release mechanism.
Figure 6B:
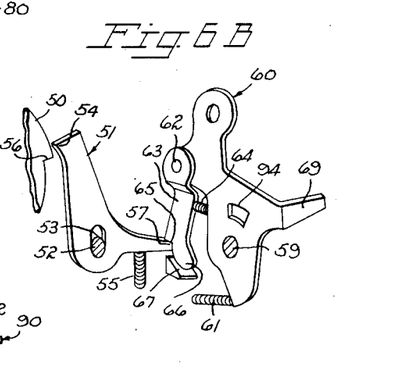

As best shown in Figure 5 the main control arm 60 is formed with a lateral projection 69 which engages on the upper edge of the lever 80 so that downward movement of the arm 60 from its dash-line position to its full-line position will cause downward movement of the lever 80. Accordingly, when the hose nozzle 18 is placed on the hook 20 the lever 80 is moved to the full line position and the motor switch 19 is automatically turned to the off position.

A further interlock of the main control arm 60 and the power control lever 80 is provided by an L-shaped latch member 90, best shown in Figure 5, which is pivoted at 91 and includes a nose portion 92 which is adapted to engage underneath a shoulder 83 provided on the power control lever 80, and which will prevent pivoting movement of the lever from its full-line position to dash-line position to turn on the pump motor while the latch 90 is in the position shown in Figure 5. The latch member 90 is provided with a lug 93 at its opposite end and which extends into an opening 94 in the main control arm 60. The opening 94 is so shaped that when the main control arm 60 is moved from dash line position to full line position the trailing edge of the opening 94 will engage the lug 93 and thereby pivot the latch 90 into the latching position shown in Figure 5, whereby movement of the power control lever 80 is prevented and the pump motor 12 cannot be turned on, but if the main control arm 60 is in the dash line position the latch 90 will be free to be moved out of latching position.

Figure 4A:
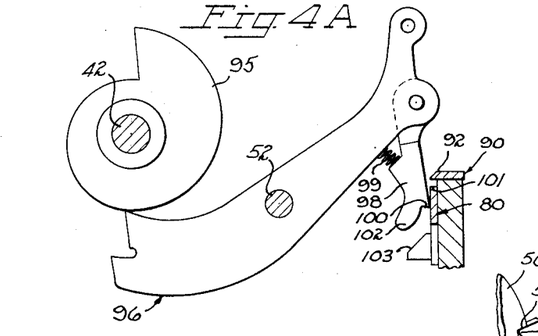
Figs. 4A, 4B and 4C are cross-sectional views taken along the line 4A—4A in Fig. 5 and showing the elements disposed in different positions resulting from a resetting operation.
Figure 4B:
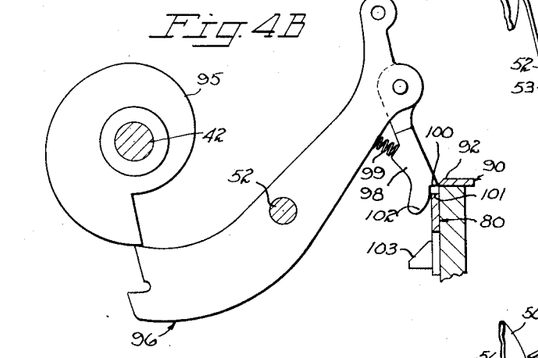
Figure 4C:
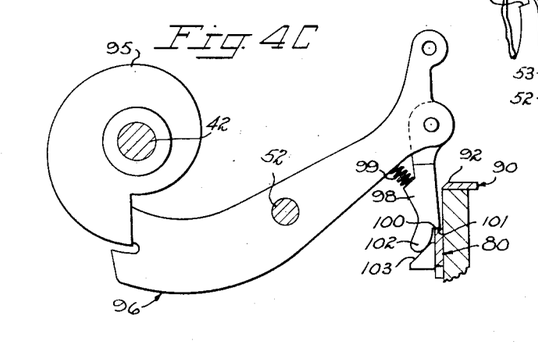

To the outer end of the main reset shaft 42, in side by side relationship with the disk 50, there is provided an involute cam member 95. Also pivoted on the stud 52, is a cam lever 96 which is connected at its right hand end (as viewed in Fig. 4) to a coil spring 97 which urges the opposite end of the cam lever 96 into engagement with the cam member 95. When the reset shaft 42 is turned through one complete revolution, the left hand end of cam lever 96 is gradually moved downwardly until the resetting operation is completed whereupon the cam lever 96 drops off the high point of the cam and is abruptly moved to the position shown under the influence of spring 97. Figs. 4A, 4B and 4C illustrate the movement of the cam lever 96 during the resetting operation.

Pivoted to the right hand end of the cam lever 96 is a boot-like pawl 98, as best shown in Figs. 4A, 4B and 4C and similar to previously described pawl 63, which is urged away from the arm 96 by spring 99. The pawl 98 has a heel portion 100 which is arranged to engage on the shoulder 101 of the power control lever 80 when the right hand end of the cam lever 96, as viewed in Fig. 4B, is raised sufficiently, by the action of the cam 95 during a resetting operation, so that the heel portion 100 clears the top of the shoulder 101. If the latch member 90 is in the way i. e. in the latching position shown in the drawing and the main control arm 60 is in its dash line position during the time that the pawl 98 is raised, the pawl 98 will wipe against the latch member 90 and thereby cam it to inoperative position as shown in Fig. 4C. Thereafter, when the resetting operation has been completed to return the cam 95 to the position shown in Fig. 4 which permits the engaging end of the cam lever 96 to drop off the high portion of the cam 95 under the influence of spring 97, the pawl 98 is pushed downwardly and moves the power control lever from full line position to dash line position, thereby turning on the pump motor. On the other hand, if raising of the pawl 98 takes place while the main control arm 60 is in its solid line position (as when the hose nozzle is on its supporting hook) the latch member 90 cannot be cammed out of latching position and instead it will cam the pawl 98 away from the shoulder 101 so that the heel portion 100 will not engage on shoulder 101, thus rendering the pawl 98 inoperative to move the power control lever and thus turn on the pump motor when the opposite end of the cam lever 96 drops off the high portion of the cam 95.

It also will be noted, as viewed in Figs. 4A, 4B, and 4C, that the pawl 98 is formed with a toe portion 102 which is adapted to engage against an inclined surface 103 when the pawl 98 has been lowered sufficiently to move the power control lever 80 to the on position. The camming action which results disengages the heel portion 100 of pawl 98 from the shoulder 101 so that the power control lever 80 is now free to be moved from on to off position, as desired, without interference from cam lever 96 and its associated spring 97.

Figure 7:
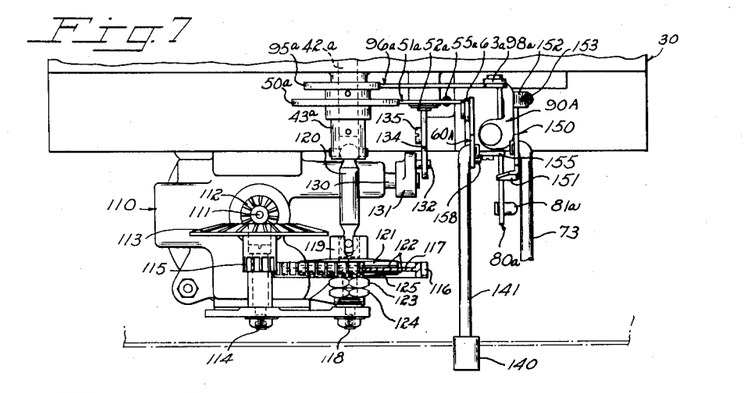
Fig. 7 is a plan view of a modified form of the interlocking mechanism applied to a register having a motor drive for the resetting mechanism.
Figure 8:
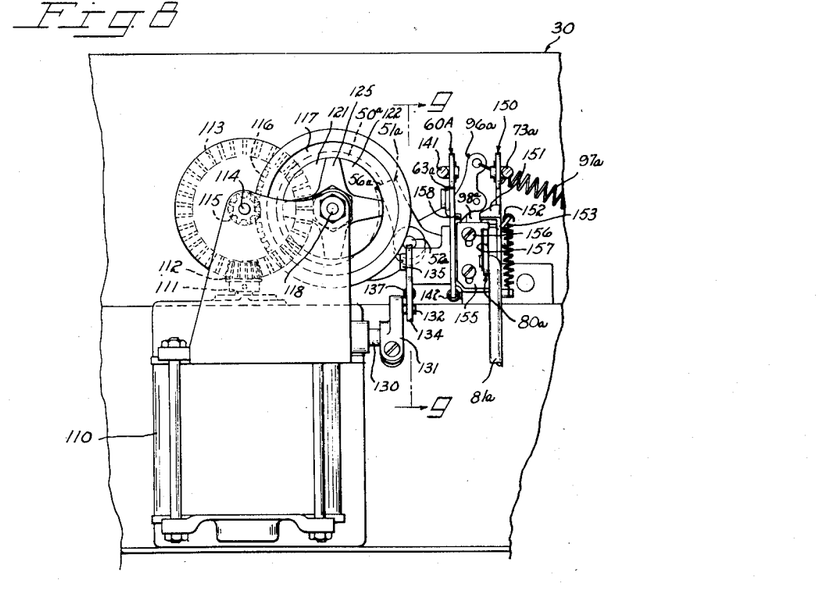
Fig. 8 is a fragmentary front view of the modified arrangement shown in Fig. 7.

As previously mentioned, the embodiment of the present invention shown in Figures 1–6 of the drawings is intended for use with a manually operated reset mechanism. The embodiment shown in Figures 7–10 is a modification of the invention as utilized with a power driven reset mechanism. As best shown in Figures 7 and 8, the dispensing apparatus in this embodiment, is provided with a small motor 110 for driving the reset shaft in place of the hand crank 44. The power output shaft 111 of the motor has fixed thereto a bevel gear 112 which meshes with a bevel gear 113 rotatably mounted on the stud 114 and having a toothed hub portion 115 which is in mesh with a gear 116. The gear 116 is formed with a central portion 117 and is rotatably mounted on an elongated coupling 119 supported on a stud 118. The coupling 119 is adapted to receive one end of a jack shaft 120 extending to the adjacent coupling 43a of the main reset shaft 42a. A frictional drive is provided between the coupling 119 and the gear 116 by means of a flange 121 on the coupling and a star-shaped spring washer 125 which also may be keyed on the coupling 119, the flange 121 and washer 125 being disposed on opposite sides of the central portion 117 of the gear. Disks 122 formed of suitable frictional material are disposed between the flange 121 and portion 117 and between washer 125 and portion 117. The pressure of the washer 125 and hence the force of the frictional engagement is regulated by nut 123 and lock nut 124 threadably received on the outer end of coupling 119.

The motor 110 is adapted to be turned on and off by a suitable switch 130 having an operating crank arm 131 secured thereto. On the outer end of arm 131 there is provided a pin 132 which is received in a slot 133 of an L-shaped actuating member 134 which is pivoted on stud 135 and biased in a clockwise direction as viewed in Fig. 9 by a spring 137. The actuating arm 134 has a nose portion 136 which is engaged by the under side of the pawl 51a adjacent the pivot stud 52a. Accordingly, when the pawl 51a is moved upwardly upon release by pawl 63a the lever arm 134 is also permitted to pivot, this by the action of spring 137 to turn on the reset motor 110. At the completion of reset the pawl 51a returns to its original position halting further turning movement of the reset shaft 42a and at the same time pivoting the actuating arm 134 in a counter-clockwise direction to the position shown in Fig. 9 to open the reset motor switch 130. Any overrunning of the reset motor 110 or any inertia effect is rendered harmless by reason of the frictional drive previously described.

In the embodiment shown in Figures 7–10 many of the elements are exactly the same as the elements utilized in the embodiment shown in Figures 1–6 described above. Accordingly, as to those elements, the same reference numerals will be utilized throughout with the suffix a added and the following detailed description will be limited for the most part only to those elements which have been modified or added to adapt the mechanism for automatic reset.

Figure 9:
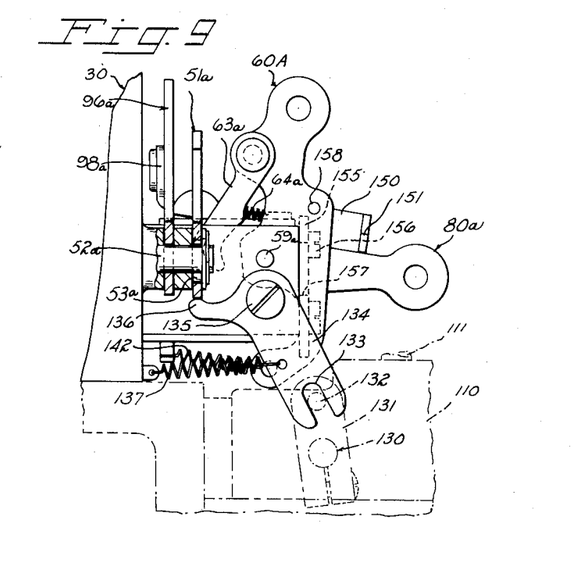
Fig. 9 is a cross-sectional view taken along the line 9—9 of Figure 8.
Figure 10:
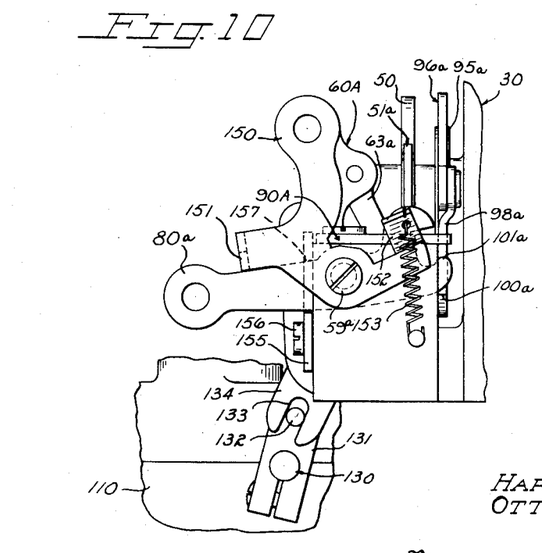
Fig. 10 is a fragmentary end view of the modified mechanism shown in Figs. 7-9.

In the embodiment shown in Figures 7–10 the main control lever denoted at 60A is generally similar to main control lever 60 previously described, in that it is similarly positioned on a stud 59a and carries a depending pawl 63a for actuating the pawl 51a when the control lever is moved in a clockwise direction, as viewed in Figure 10. Control lever 60A is not under the control of the hose nozzle, however, but instead is operated by a push button 140 which is connected to the arm 60A by a rod 141. The main control lever 60A is biased into the position shown in Figures 9–10 (in a clockwise direction as viewed in Fig. 9) by a spring 142. In other words, the bias on control lever 60A is opposite to that on main control lever 60 of the modification first described. By reason of the foregoing connections the main control lever 60A is moved in a counter-clockwise direction, as viewed in Fig. 9, when the push button 140 is pushed inwardly by the operator. This causes the pawl 63a to disengage the pawl 51a from the disk 50a in the same manner as described in connection with Figures 1–6 and starts the reset motor 110 as aforesaid so that the reset shaft is automatically turned one complete revolution, thereby resetting the register to zero or initial starting position. When the push button 140 is released the spring 142 returns the control lever 60A to starting position, as shown in Figures 9–10, and thus the mechanism is conditioned for a subsequent resetting operation.

In the modification of Figures 7–10 the connecting link 73a, which is operated by the arm 70 at the nozzle support hook 20 (Fig. 1), is connected to a third operating arm 150 pivoted on stud 59a which is provided with a laterally extending projection 151 for engaging the power control lever 80a and replacing the lateral extension 69 utilized on the main control lever 60 in the first embodiment described, the extension 69 being omitted in the present modification. Actuating arm 150 is also provided with an inclined camming surface 152 which is adapted to engage against the latch member 90A (latch member 90A is substantially the same as latch member 90 previously described and is used for the same purpose) and cams the latter into engaging position with respect to the power control lever 80a when the hose nozzle is removed from the hook and the actuating arm 150 is permitted to pivot in a clockwise direction, as viewed in Fig. 10, under the influence of spring 153. This cam surface 152 takes the place of the cam opening 94 in the main operating arm 60, and lug 93 on latch member 90 of the first modification, the opening 94 and lug 93 being omitted in the present modification.

The power control lever 80a is the same as power control lever 80 of the first described embodiment. However, lever 80a is utilized to operate an additional latch mechanism, which consists of a plate 155 which is slidably mounted on screws 156 for limited vertical movement. The plate 155 has a slotted portion 157 through which is received the power control arm 80a, with the result that when the power control lever 80 is moved to the on position the plate is raised and when the power control arm 80a is moved to the off position the plate is lowered. When the plate 155 is in its uppermost position, which occurs when the pump motor is operating, the push button 140 cannot be operated to reset the register. That is because the main operating arm 60A is provided with a pin 158 which will strike against the plate 155 and prevent movement of the arm 60a unless the plate 155 is lowered, which results only when the pump motor is turned off.

The functioning of the interlocking mechanism of the present invention will probably be apparent from the foregoing description. However, the following summary of its operation may be helpful in fully understanding the invention. Assuming that a dispensing operation is in progress, it is impossible at the same time for the operator to perform any resetting of the register, this because of the engagement of pawl 51 with disk 50 and also, in the automatic reset embodiment, the inability to press in the push button 140 due to the pin 158 and plate 155 while the pump motor is energized. The result is that the operator has no control of the register during a dispensing operation and must fully complete the delivery and actuate the lever arm 70 such as by hanging up the hose nozzle on hook 20, thereby turning off the pump motor before any resetting can be effected. Once the delivery is completed and the nozzle is returned to the hook 20, or the lever arm 70 is otherwise actuated, which automatically turns off the pump motor, resetting is rendered possible. If desired, this may be accomplished at once or can be postponed until it is desired to make a subsequent delivery. In the modification of Figs. 1-6, the operator can accomplish such resetting by again removing the hose nozzle from the hook 20 (only momentarily is sufficient) which causes pawl 51 to release disk 50 and then turning the crank 44 through one complete revolution. In the modification of Figs. 7-10, he need only press the push button 140 which simultaneously disengages pawl 51a from disk 50a and energizes the reset motor 110. If the hose nozzle is off the hook 20 in either the manual or the automatic reset embodiments during resetting, the pump motor will be turned on automatically at the completion of the reset so that a subsequent dispensing operation can be commenced at once. On the other hand, if the hose nozzle is on the hook during resetting, the apparatus merely remains at rest at the completion of resetting, this because the latch plate 90 or 90A, as the case may be, will cam the pawl 98 or 98a away from the power control lever 80 or 80a, as the case may be, so as to render the cam 95 or 95a and cam lever 96 or 96a, as the case may be, inoperative to operate the power control lever 80. Even though the register has been reset to zero at the completion of a prior dispensing operation, the only way that the pump motor can be turned on is by going through a resetting operation with the hose nozzle removed from the hook 20. In this way, it is insured that a dispensing operation will always be preceded by a resetting of the register to zero.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

We claim as our invention:

1. In a liquid dispensing apparatus of the type having a dispensing hose and nozzle and support therefor, means for inducing a flow of liquid including a pump motor, and a register having indicating means arranged to register the quantity of liquid dispensed and including means for resetting the indicating means to zero, the combination therewith of power control means movable from an original position to a position for energizing the pump motor, means energized by the operation of the resetting means and releasable by return of the indicating means to zero including a lever arm engageable with the power control means for moving the power control means to the position for energizing the pump motor, means responsive to position of the hose nozzle support for disconnecting said lever arm from the power control means when the hose nozzle is on its support, means responsive to position of the power control means for rendering the reset means inoperable when the power control means is in the position energizing the pump motor, and means for returning the power control means to original position when the hose nozzle is placed on its support.

2. In a liquid dispensing apparatus of the type having a dispensing hose and nozzle and support therefor, means for inducing a flow of liquid including a pump motor, and a register having indicating means arranged to register the quantity of liquid dispensed and including a reset shaft for resetting the indicating means to zero, the combination therewith of power control means movable from an original position to a position for energizing the pump motor, energy storing means energized by the operation of the reset shaft, actuating means operable by the energy storing means for engaging the power control means and moving the power control means to the position for energizing the pump motor, means for releasing the last-named means upon completion of a resetting operation, means responsive to position of the hose nozzle support for disengaging the actuating means from the power control means when the hose nozzle is on its support, means responsive to position of the power control means for rendering the reset means inoperable when the power control means is in the position energizing the pump motor, and manually controlled means for returning the power control means to original position.

3. In a liquid dispensing apparatus of the type having dispensing means including a pump motor, and a register having indicating means arranged to register the quantity of liquid dispensed and including means for resetting the indicating means to zero, the combination therewith of power control means movable to a position for energizing the pump motor, actuating means energized by the operation of the resetting means and releasable by return of the indicating means to zero for engaging the power control means and moving the power control means to the position for energizing the pump motor, and means for disengaging the actuating means from the power control means when the power control means is in motor energizing position.

4. In a liquid dispensing apparatus of the type having a dispensing hose and nozzle and support therefor, means for inducing a flow of liquid including a pump motor, and a register having indicating means arranged to register the quantity of liquid dispensed and including a reset shaft for resetting the indicating means to zero, the combination therewith of power control means movable to a position for energizing the pump motor, means conditioned for operation by turning of the reset shaft and released by return of the indicating means to zero for moving the power control means to the position for en-energizing the pump motor, and means responsive to position of the hose nozzle support for disconnecting the last-named means from the power control means when the hose nozzle is on its support.

5. In a liquid dispensing apparatus of the type having dispensing means including a pump motor, and a register having indicating means arranged to register the quantity of liquid dispensed and including means for resetting the indicating means to zero, the combination therewith of power control means movable to a position for energizing the pump motor, spring operated means for engaging the power control means and moving the power control means to the position for energizing the pump motor, means operated by the resetting means for loading the spring during a resetting operation and for releasing the spring operated means at the completion of reset, means for disengaging the spring operated means from the power control means when the power control means is in motor energizing position and means responsive to position of the power control means for rendering the reset mechanism inoperable when the power control means is in the position for energizing the pump motor.

6. In a liquid dispensing apparatus of the type having dispensing means including a pump motor, and a register having indicating means arranged to register the quantity of liquid dispensed and including means for resetting the indicating means to zero, the combination therewith of a pivoted power control lever movable to a position for energizing the pump motor, an involute cam mounted for rotation by the resetting means, a pivoted cam lever biased for engagement of one end of the lever with the cam, pawl means at the opposite end of the lever for engaging the power control lever when the cam lever is in engagement with the cam at its highest point, and cam means for pivoting the pawl out of engagement with the power control lever when the cam lever is in engagement with the involute cam at its lowest point.

7. In a liquid dispensing apparatus of the type having dispensing means including a pump motor, and a register having indicating means arranged to register the quantity of liquid dispensed and including means for resetting the indicating means to zero, the combination therewith of power control means movable to a position for energizing the pump motor, a notched member arranged for rotation by the resetting means through one revolution during a resetting operation, a pawl mounted for engagement with said notched member for limiting turning of the member to one revolution, manually controlled means for temporarily moving the pawl into disengaging position to condition the apparatus for a resetting operation, and means rendering the last-named means inoperable when the power control means is in position for energizing the pump motor.

8. In a liquid dispensing apparatus of the type having dispensing means including a pump motor, and a register having indicating means arranged to register the quantity of liquid dispensed and including means for resetting the indicating means to zero, the combination therewith of power control means movable to a position for energizing the pump motor, a disk arranged for rotation by the resetting mechanism through one complete revolution when the indicating means are reset to zero, said disk having a shoulder facing in the direction of rotation during resetting, a pawl mounted for pivoting movement and also for limited translatory movement in a direction generally tangential to the disk, means biasing the pawl into engagement with the shoulder, means for momentarily pivoting the pawl to permit translatory movement of the pawl to a position disengaging the shoulder, and means for rendering the last-named means inoperable when the power control means is in position for energizing the motor.

9. In a liquid dispensing apparatus of the type having dispensing means including a pump motor and a register having indicating means arranged to register the quantity of liquid dispensed and including means for resetting the indicating means to zero, the combination therewith of a notched member mounted for rotation and arranged to be rotated through one complete revolution by the resetting means when the indicating means are reset to zero, a pawl mounted for pivoting movement and biased into engagement with said member, a pivotally mounted arm carrying a pawl for engaging the first-named pawl and arranged to pivot the first-named pawl out of engagement with the rotatable member when the arm is pivoted, cam means for disengaging the second-named pawl upon completion of the disengaging movement, and manually operable means for pivoting the arm.

10. In a liquid dispensing apparatus of the type having a dispensing hose and nozzle and support therefor, means for inducing a flow of liquid including a pump motor, and a register having indicating means arranged to register the quantity of liquid dispensed and including means for resetting the indicating means to zero, the combination therewith of power control means movable to a position for energizing the pump motor, means energized by the operation of the resetting means and releasable by return of the indicating means to zero for moving the power control means to the position for energizing the pump motor, a notched member mounted for rotation by the resetting means through one complete revolution during a resetting operation, a pawl for engaging the notched member to prevent a resetting operation until the pawl is released and for limiting resetting movement to one complete revolution of the notched member, manually operable means for disengaging the pawl, and means preventing operation of the last-named means when the power control means is in the position for energizing the pump motor.

11. In a liquid dispensing apparatus having a dispensing hose and nozzle and support therefor, means for inducing a flow of liquid including a pump motor having a power control switch, and a register having indicating means arranged to register the quantity of liquid dispensed and including means for resetting the indicating means to zero, the combination therewith of a pivoted member for connection to the power control switch of the pump motor, a pivoted actuating arm for actuating the said pivoted member in a direction to close the power control switch, spring means for pivoting the actuating arm in an actuating direction, cam means arranged for operation by the resetting means for pivoting the actuating arm in a reverse direction during a resetting operation and for releasing the arm at the completion of reset, a latch member for preventing operation of the said pivoted member arranged to be moved into latching position by placement of the hose nozzle on its support, said latch member being effective to render the last-named means inoperable when the hose nozzle is on its support, but being movable to unlatching position by the actuating arm when the hose nozzle is off its support, means rendering the reset means inoperable when the said pivoting member is in position for energizing the pump motor, and means for moving the said pivoted member to position for deenergizing the pump motor when the hose nozzle is on its support.

12. In a liquid dispensing apparatus having a dispensing hose and nozzle and support therefor, means for inducing a flow of liquid including a pump motor energized through a power control switch, and a register having indicating means arranged to register the quantity of liquid dispensed and including means for resetting the indicating means to zero, the combination therewith of a movable member for connection to the power control switch, a pivoted actuating arm for actuating the movable member to a position for closing the switch, spring means for pivoting the arm in an actuating direction, an involute type cam arranged for operation by the resetting means for pivoting the actuating arm in a reverse direction during a resetting operation and for releasing the arm at the completion of reset, a pivoted depending pawl on the actuating arm urged into engagement with the said movable member, cam means arranged to move the pawl to a disengaging position upon completion of movement of the actuating arm in an actuating direction, a latch member for preventing operation of the movable member to motor energizing position arranged to be moved into latching position by placement of the hose nozzle on its support, said latch member being effective to move the pawl to disengaging position when the hose nozzle is on its support but being movable to unlatching position by the pawl when the hose nozzle is off its support, means rendering the reset means inoperable when the movable member is in position for energizing the pump motor, and means operable to move the movable member to original position for deenergizing the pump motor when the hose nozzle is placed on its support.

13. In a liquid dispensing apparatus having a dispensing hose and nozzle and support therefor, means for inducing a flow of liquid including a pump motor provided with a power control switch, and a register having indicating means arranged to register the quantity of liquid dispensed and including means for resetting the indicating means to zero, the combination therewith of means for locking the reset mechanism in a position at which the indicating means have been reset to zero and arranged to be releasable to permit a single resetting operation, a plurality of arms mounted in side by side relationship for limited pivoting movement, the first of said arms being biased in a direction for releasing the reset locking means and being arranged for pivoting in a reverse direction when the hose nozzle is placed on its support, and the second of said arms being arranged for connection to the power control switch of the pump motor, said first arm having an extension for engaging the second arm to move the second arm to position for deenergizing the pump motor when the first arm is pivoted by placement of the hose nozzle on its support, and means rendering the first arm inoperable to release the reset locking means when the second arm is in position for energizing the pump motor.

14. In a liquid dispensing apparatus having a dispensing hose and nozzle and support therefor, means for inducing a flow of liquid including a pump motor, and a register having indicating means arranged to register the quantity of liquid dispensed and including means for resetting the indicating means to zero, the combination therewith of power control lever movable from an original position to a position for energizing the pump motor, a pivoted arm having a pawl biased into engagement with the power control lever, spring means urging the pivoted arm in a direction to move the power control lever to pump motor energizing position, an involute cam arranged for rotation by the resetting means for pivoting the arm in the opposite direction during a resetting operation and for releasing the arm at the completion of resetting, means for preventing engagement of the power control lever by the pawl when the hose nozzle is on its support, a disk mounted for rotation by the resetting means during a resetting operation having a shoulder facing in the direction of rotation during resetting, a pawl mounted for pivoting movement and limited translatory movement generally tangential to the disk, means urging the pawl into engagement with said shoulder, self disengaging means for pivoting the last-named pawl, means rendering the last-named means inoperative when the power control lever is in position for energizing the pump motor, and means for returning the power control lever to original position when the hose nozzle is on its support.

15. In a liquid dispensing apparatus of the type having dispensing means including a pump motor and a register having indicating means arranged to register the quantity of liquid dispensed and including a reset shaft of the type which is stationary during a dispensing operation for resetting the indicating means to zero, the combination therewith of power control means movable to a position for energizing the pump motor, locking means for interrupting movement of the reset shaft when the indicating means are returned to zero and releasable to permit a subsequent resetting operation, power means for rotating the resetting shaft, friction means connecting the power means to the reset shaft, means for simultaneously energizing the said power means and releasing the locking means, means rendering the last-named means inoperable when the power control means is in position for energizing the pump motor, and means for deenergizing the power means at the completion of a resetting operation.

16. In a liquid dispensing apparatus of the type having dispensing means including a pump motor, and a register having indicating means arranged to register the quantity of liquid dispensed and including means for resetting the indicating means to zero, the combination therewith of a power control lever movable to a position for energizing the pump motor, actuating means conditioned by operation of the resetting mechanism and released by return of the indicating means to zero for engaging the power control lever and moving it to the position for energizing the pump motor, means for disengaging the actuating means from the power control lever when the power control lever is in pump motor energizing position, a reset motor for operating the resetting means, manually operable means for energizing the reset motor, and means responsive to position of the power control lever rendering the last-named means inoperative when the power control lever is in position for energizing the pump motor.

17. In a liquid dispensing apparatus of the type having a dispensing hose and nozzle and support therefor, means for inducing a flow of liquid including a pump motor and a register having indicating means arranged to register the quantity of liquid dispensed and including means for resetting the indicating means to zero, the combination therewith of a power control lever movable from an original position to a position for energizing the pump motor, actuating means conditioned by operation of the resetting mechanism and released by return of the indicating means to zero for engaging the power control lever to move it to the position for energizing the pump motor, means for disengaging the last-named means from the power control lever when the hose nozzle is on its support, a reset motor for operating the resetting means, manually operable means for energizing the resetting motor, means responsive to position of the power control lever for preventing operation of the last-named means when the power control lever is in the position for energizing the pump motor, and means for returning the power control means to original position when the hose nozzle is on its support.

18. In a liquid dispensing apparatus having a dispensing hose and nozzle and support therefor, means for inducing a flow of liquid including a pump motor energized through a power control switch, and a register having indicating means arranged to register the quantity of liquid dispensed and including means for resetting the indicating means to zero, the combination therewith of a reset motor for connection to said resetting means and provided with a control switch, a plurality of arms mounted in side by side relationship for limited pivoting movement, the first of said arms being arranged to operate the control switch of the reset motor, the second of said arms being arranged for connection to the power control switch of the pump motor, and the third of said arms being arranged for actuation when the hose nozzle is placed on its support, an extension of the third arm extending across the second arm to cause the second arm to open the power control switch of the pump motor when the third arm is pivoted by placement of the hose nozzle on its support, manually operable means for pivoting the first arm to energize the reset motor, and means for preventing operation of the last-named means when the second arm is in position for energizing the pump motor.

HARVEY N. BLISS.
OTTO WILD, Jr.

References Cited in the file of this patent

UNITED STATES PATENTS

| Number | Name | Date |
|---|---|---|
| 2,109,352 | Hazard | Feb. 22, 1938 |
| 2,336,381 | Woodford et al. | Dec. 7, 1943 |
| 2,413,036 | De Lancey | Dec. 24, 1946 |